April 6, 1965   W. H. KOHLES   3,177,337
ELECTRICAL DISCHARGE MACHINING OF PRINTED CIRCUIT BOARDS
Filed Aug. 15, 1962   2 Sheets-Sheet 1

INVENTOR.
W. H. KOHLES
BY S. Gunderson

INVENTOR.
W. H. KOHLES
BY
S. Gundersen

United States Patent Office 3,177,337
Patented Apr. 6, 1965

3,177,337
ELECTRICAL DISCHARGE MACHINING OF PRINTED CIRCUIT BOARDS
Werner H. Kohles, Worthington, Ohio, assignor to Western Electric Company, Incorporated, New York, N.Y., a corporation of New York
Filed Aug. 15, 1962, Ser. No. 217,148
2 Claims. (Cl. 219—69)

This invention relates to methods and apparatus for spark-erosion machining of printed circuit boards and particularly to maintaining the shape of an electrode utilized in a spark-erosion process to produce a plurality of uniform products therefrom.

A primary object of this invention is to provide new and improved methods and apparatus for machining printed circuit boards by a spark-erosion process.

Another object of the invention is to provide methods and apparatus for reshaping a worn electrode used in a spark-erosion process of forming metal patterns on printed circuit boards.

With these and other objects in view, the present invention contemplates the relative movement between an insulation base having a metal foil on one surface thereof and a spaced electrode roller having peripheral projections in a desired pattern. A voltage source is connected between the metal foil and the electrode roller and the apparatus is placed in a dielectric solution where, upon the relative movement of the base and the roller and the application of the voltage, a spark-erosion process results to erode portions of the metal foil and form a desired pattern of the metal foil on the insulation base.

During the spark-erosion process, the pattern formed on the periphery of the electrode roller wears slightly and a master roller having impressions formed in the periphery thereof which coincide with the pattern formed on the electrode roller is positioned adjacent to the electrode roller to continuously engage and reshape the projecting patern formed on the electrode roller.

These and other objects and advantages of the invention will be apparent from the following detailed description of the fixture embodying the invention when read in conjunction with the drawings, in which.

Figure 1:
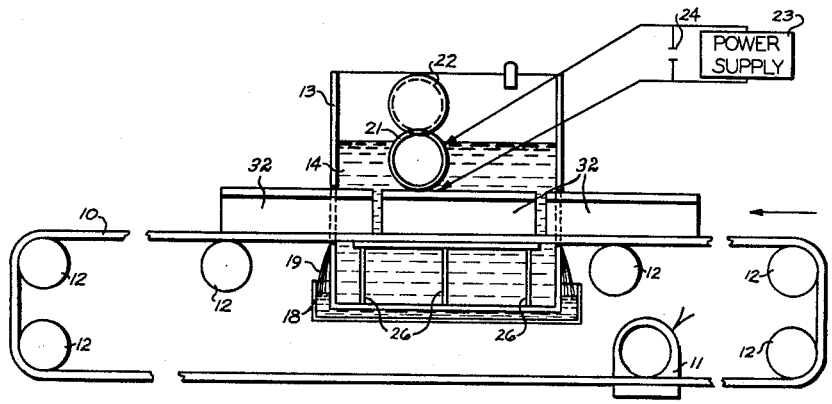
FIG. 1 is a diagrammatical view showing a conveyor system for passing a series of conductive coated insulation panels adjacent to an electrode roller in a dielectric solution.

Referring to FIG. 1, a conveyor 10 is driven by a motor 11 over guide rollers 12 and passes through a tank 13 containing a dielectric solution 14. An insulation base 16 having a metal foil 17 on one surface thereof is positioned on the conveyor 10 for passage through the tank 13. A second tank 18 is positioned beneath the first tank 13 to receive that portion 19 of the solution 14 which escapes from the tank 13 during the passage of the conveyor 10 through the tank 13. An electrode roller 21 is positioned within the tank 13 and in the solution 14 superjacent to and spaced from the metal foil 17 of the insulation panel 16 to provide a spark gap therebetween. A master roller or former 22 is positioned superjacent to and in engagement with the electrode roller 21 to continuously reshape the electrode roller 21 during the spark-erosion process. A power supply 23 is connected across a capacitor bank 24 and is further connected between the metal foil 17 and the electrode roller 24 to provide an electrical discharge potential. In addition, a support device consisting of vertical members 26 and upper horizontal members 27 is positioned beneath the conveyor 10 and within the tank 13 to support the conveyor and the base 16 during the spark-erosion process.

Figure 2:
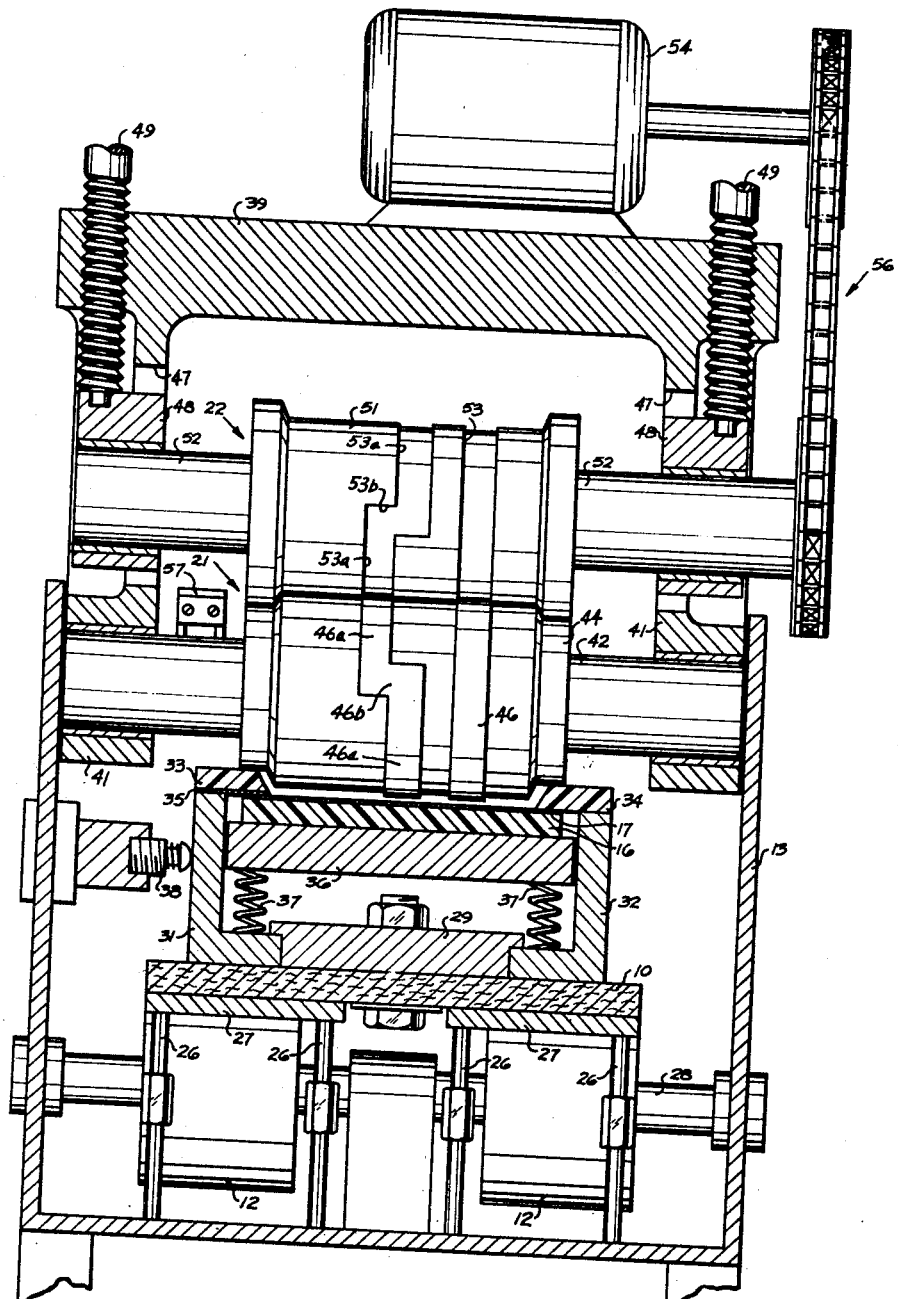
FIG. 2 is a sectional view showing the relationship between the electrode roller and a master roller.

As shown in FIG. 2, the vertical supports 26 are positioned in the tank 13 and support the horizontal members 27. Further, the conveyor 10 is positioned over the guide rollers 12 which are mounted for rotation on a shaft 28. A T-clamp 29 is fixedly mounted to the conveyor 10 and clamps a pair of conductive L-shaped members 31 and 32 to the conveyor 10. A pair of nonconductive extensions 33 and 34 extend from the upper portion of the L-shaped members 31 and 32, respectively. In addition, a conductive strip 35 is positioned between the L-shaped member 31 and the extension 33. A plate 36 is positioned within an enclosure which is formed between the L-shaped members 31 and 32 and the extensions 33 and 34 and is supported by compression springs 37. The insulation base 16 with the metal foil 17 is positioned on the plate 36 and is resiliently held between the plate 36 and the extensions 33 and 34. The plate 36 could be modified for connection to a vacuum source (not shown) so that the base 16 could be vacuumly gripped to the plate 36. It is to be noted that the conductive strip 35 contacts the blank portion of the foil 17 prior to the passing of the foil under the roller 21, thereby insuring electrical contact during the spark-erosion process for a given base 16. A resiliently mounted contact 38 engages the conductive L-shaped member 31, thereby connecting one side of the power supply 23, and hence the capacitor bank 24, to the metal foil 17 through the conductive strip 35.

Figure 3:
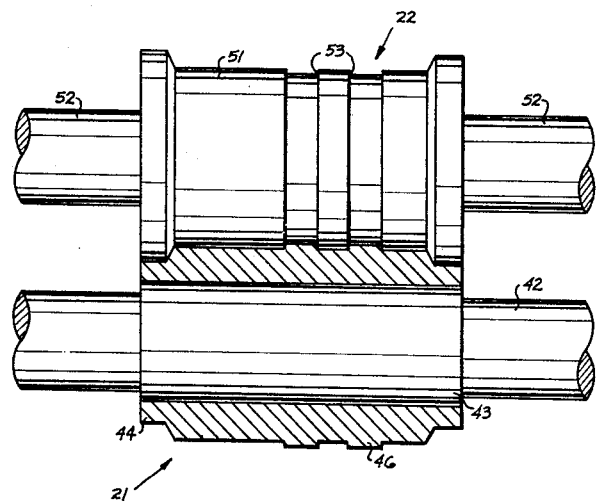
FIG. 3 is a partially sectioned fragmentary view showing the mating engagement between the electrode roller and the master roller.

A yoke 39 is formed with a pair of bushings 41 for supporting a steel electrode arbor 42 for rotation therein. As shown in FIG. 3, the electrode arbor 42 is provided with a tapered portion 43 intermediate the ends thereof for receiving a copper sleeve 44 thereon. The copper sleeve 44 is formed with a laterally displaced projecting pattern 46 having well-defined impressions, wherein the assembly forms the electrode roller 21. It is noted that the pattern 46 is laterally displaced, as shown in FIG. 2, wherein circumferential sections 46a are connected by axially aligned section 46b. Further, while the lateral displacement of the pattern 46 is shown perpendicular in FIG. 2, the displacement could assume any laterally random direction in accordance with the desired pattern. The yoke 39 is further provided with a pair of opposed openings 47 to receive a pair of bushings 48 therein. A pair of adjusting screws 49 are threadedly mounted in, and extend through, the yoke 39 and are connected to the bushings 48 where, upon movement of the adjusting screws 49, the bushings 48 move within the openings 47 of the yoke 39. A hardened steel impression roll 51 is provided with a pair of shaft extensions 52 extending therefrom and mounted for rotation in the bushings 48. The impression roll 51 is formed with a depressed or recessed pattern 53, which corresponds to the laterally displaced projecting pattern 46 formed on the copper sleeve 44. Again, as shown in FIG. 2, it is noted that the recessed pattern 53 conforms to the lateral displacement of the pattern 46 of the electrode arbor 42, wherein circumferential sections 53a are connected by axially aligned section 53b. The impression roll 51, with the recessed pattern 53, forms the master roller 22.

A motor 54 is mounted atop the yoke 39, and is connected to a gear drive system 56 for driving the shaft extension 52 of the master roller 22. It is to be noted that the impression roll 51 and the recessed pattern 53 frictionally engage the copper sleeve 44 and the projecting pattern 46, respectively, so that the rotational movement of the impression roll 51 frictionally drives the copper sleeve 44, thereby providing rotational movement for the electrode roller 21. The yoke assembly is positioned within the opening of the tank 13 so that the extended ends of the copper sleeve 44 are supported by the nonconductive extensions 33 and 34, thereby insuring proper uniform gap spacing between the laterally displaced projecting pattern 46 of the electrode roller 21 and the metal foil 17 on the panel 16 during the spark-erosion process. By movement of the adjusting screws 49, the master roller 22 engages the electrode roller 21 in such a manner that the laterally displaced recessed pattern 53, formed on the impression roll 51, is urged into engagement with the laterally displaced projections 46 of the electrode sleeve 44, as viewed in FIG. 3. A contact block 57 is connected to the arbor 42 to connect the power supply 23 to the electrode roller 21.

In operation, the insulation base 16 with the metal foil 17 is passed through the tank 13 containing the dielectric 14 in a spaced relation with the electrode roller 21. As the base 16 with the metal foil 17 passes beneath the electrode roller 21, the roller is rotated by the frictional engagement with the rotating master roller 22. Since an electrical potential exists between the metal foil 17 and the roller 21 by virtue of the power supply 23 and the capacitor bank 24, a spark-erosion process occurs within the area of the spark gap wherein those portions of the metal foil 17, which are adjacent the patterned projections 43, are eroded away by the spark-erosion process, thereby developing a desired pattern of the remaining metal foil 17 on the insulation base 16. As the spark-erosion process occurs between the metal foil 17 and the laterally displaced projections 46 of the copper sleeve 44, the projections 43 wear slightly and are subsequently deformed into an undesirable and undefined shape. To overcome this deficiency in the spark-erosion process, the hardened steel master roller 22 is positioned adjacent to and in frictional contact with the electrode roller 21 with the laterally displaced recess pattern 53 coinciding with the projections 43. The master roller 22 is rotated simultaneously with the electrode roller 21 through the frictional engagement of the two rollers so that the laterally displaced projections 43 are reshaped by engagement with the corresponding laterally displaced well-defined recessed pattern 51 in a cold-rolling process. In this manner, the periodic removal of the electrode roller 21 for reshaping of the projections 43 is obviated. A reshaping operation utilizing the master roller 22 is continuous and permits uninterrupted operation of the spark-erosion process.

It is to be understood that the above-described arrangements are simply illustrative of the principles of the invention. Other arrangements may be devised by those skilled in the art which will embody the principles of the invention and fall within the spirit and scope thereof.

What is claimed is:

1. An apparatus for forming a metal pattern on an insulation base by a spark-erosion process comprising:

an electrode roller having laterally displaced projections formed in a well-defined pattern on the periphery thereof, a master roller having a recessed laterally displaced pattern formed in the periphery thereof coincident with the laterally displaced pattern formed on the electrode roller, the master roller positioned adjacent to the electrode roller so that the projections of the electrode engage and are impressed in the laterally displaced recessed pattern formed in the master roller, means for conveying the insulation base having a metal foil on one surface thereof subjacent to and spaced from the projections of the electrode roller so that a spark gap is formed therebetween, means for applying an electrical discharge potential between the metal foil and the laterally displaced projections of the electrode roller so that a spark is developed in the spark gap thereby eroding away the metal foil adjacent to the projections, and means for simultaneously rotating the electrode roller and the master roller so that a pattern is eroded in the metal foil corresponding to the pattern of the electrode roller and the worn laterally displaced projections of the electrode roller resulting therefrom are reshaped by the corresponding laterally displaced recessed pattern of the master roller to provide well-defined projections for subsequent spark-erosion processes.

2. An apparatus for forming a metal pattern on an insulation base by a spark-erosion process comprising:

an electrode roller having laterally displaced projections formed in a desired pattern on the periphery thereof, means for conveying the insulation base having a metal foil on one surface thereof subjacent to and spaced from the laterally displaced projections of the electrode roller so that a spark gap is formed therebetween, means for applying an electrical discharge potential between the metal foil and the projections of the electrode roller so that a spark is developed in the spark gap thereby eroding away the metal foil adjacent to the projections, means for rotating the electrode roller so that a pattern is formed in the metal foil on the insulation base by the spark-erosion process as determined by the laterally displaced pattern on the electrode roller, a master roller having a laterally displaced recessed pattern formed in the periphery thereof adjacent to the electrode roller for receiving the laterally displaced electrode projections therein, and means for rotating the master roller in pressure contact with the electrode roller so that worn and deformed laterally displaced projections of the electrode roller resulting from the spark-erosion process are continuously reshaped by the corresponding laterally displaced recessed pattern of the master roller to provide well-defined projections on the electrode for subsequent spark-erosion processes.

References Cited by the Examiner

UNITED STATES PATENTS

| | | | |
|---|---|---|---|
| 1,797,624 | 3/31 | Sjolander | 219—84 |
| 2,785,280 | 3/57 | Eisler et al. | 219—69 |
| 2,957,975 | 10/60 | Pearson | 219—81 |

FOREIGN PATENTS

| | | |
|---|---|---|
| 1,202,526 | 7/59 | France. |
| 1,224,109 | 2/60 | France. |

RICHARD M. WOOD, *Primary Examiner.*